(12) United States Patent
Solet

(10) Patent No.: US 7,038,126 B2
(45) Date of Patent: May 2, 2006

(54) CABLE/WIRE AND ELECTRONIC DEVICE STORAGE CONTAINER

(76) Inventor: Jo Solet, 15 Berkeley St., Cambridge, MA (US) 02138

( * ) Notice: Subject to any disclaimer, the term of this patent is extended or adjusted under 35 U.S.C. 154(b) by 0 days.

(21) Appl. No.: 10/607,279

(22) Filed: Jun. 25, 2003

(65) Prior Publication Data

US 2004/0104037 A1   Jun. 3, 2004

Related U.S. Application Data

(60) Provisional application No. 60/391,540, filed on Jun. 25, 2002.

(51) Int. Cl.
*H02G 3/08* (2006.01)

(52) U.S. Cl. .............................. 174/50; 174/59; 174/53; 174/135; 220/3.2; 220/4.02; 361/600; 361/641

(58) Field of Classification Search ................... 174/50, 174/135, 59, 48, 49, 17 VA, 17 R, 52.1, 53, 174/57, DIG. 9; 220/3.2, 3.3, 4.02, 3.8; 439/501, 528, 535; 361/600, 724, 726, 797, 361/608, 641, 676, 679, 694, 730, 826; 385/134, 385/135; 211/26; 320/111
See application file for complete search history.

(56) References Cited

U.S. PATENT DOCUMENTS

| | | | | |
|---|---|---|---|---|
| 1,396,434 A | * | 11/1921 | Horton | ........................ 220/3.8 |
| 2,763,707 A | | 9/1956 | Saderberg | |
| 3,337,682 A | | 8/1967 | Swett | |
| 4,167,983 A | * | 9/1979 | Seider et al. | ............... 180/19.1 |
| 4,705,484 A | | 11/1987 | Lerner et al. | |
| 4,944,694 A | | 7/1990 | Dorn | |
| 5,103,998 A | * | 4/1992 | Caro et al. | .................. 220/533 |
| 5,152,395 A | * | 10/1992 | Cross | ........................... 211/26 |
| 5,205,629 A | * | 4/1993 | Simons | .................... 312/249.9 |
| 5,231,562 A | | 7/1993 | Pierce et al. | |
| 5,721,394 A | * | 2/1998 | Mulks | .......................... 174/48 |
| 5,755,350 A | * | 5/1998 | Marthaler | .................... 220/324 |
| 5,779,366 A | | 7/1998 | McKenzie, III et al. | ...... 383/22 |
| 5,924,892 A | | 7/1999 | Ferracina et al. | |
| 6,000,464 A | | 12/1999 | Scafidi et al. | .......... 165/104.33 |
| 6,008,621 A | * | 12/1999 | Madison et al. | ............. 320/107 |
| 6,017,228 A | | 1/2000 | Verbeek et al. | |
| 6,122,173 A | * | 9/2000 | Felcman et al. | ............. 361/726 |
| 6,218,796 B1 | * | 4/2001 | Kozlowski | ................... 318/280 |
| 6,329,597 B1 | * | 12/2001 | Kaloustian | ..................... 174/67 |
| 6,362,421 B1 | * | 3/2002 | Layton, Jr. | ..................... 174/50 |
| 6,362,951 B1 | * | 3/2002 | Moribe et al. | ........... 174/17 VA |

(Continued)

FOREIGN PATENT DOCUMENTS

FR    2767316    2/1999

(Continued)

Primary Examiner—Angel R. Estrada
(74) Attorney, Agent, or Firm—Kudirka & Jobse LLP; Inna S. Landsman

(57) ABSTRACT

Storage containers and storage container kits for storing electronic devices and cables/wires are disclosed. The storage container comprises a first rigid divider that is attached to said storage container and is substantially parallel to two sides of said substantially rectangular storage container, a compartment having a plurality of ventilation holes, wherein said first rigid divider forms one side of said compartment, and a plurality of electrical outlets associated with said first rigid divider. A kit is disclosed for converting a storage container into a cable and electronics storage device, comprising (a) a first rigid divider that is attachable to said storage container, (b) a plurality of electrical outlets attached or attachable to the top edge of said first rigid divider, and (c) instructions for perforating said storage container with a plurality of ventilation holes.

23 Claims, 7 Drawing Sheets

U.S. PATENT DOCUMENTS

| | | |
|---|---|---|
| 6,395,981 B1 | 5/2002 | Ford et al. .................... 174/50 |
| 6,406,327 B1 | 6/2002 | Soon |
| 6,467,619 B1 * | 10/2002 | Leen et al. ................. 206/421 |
| 6,502,656 B1 * | 1/2003 | Weiss et al. ................ 180/168 |
| 6,653,561 B1 * | 11/2003 | Lalancette et al. ........... 174/50 |
| 6,844,494 B1 * | 1/2005 | Nevins ....................... 174/53 |

FOREIGN PATENT DOCUMENTS

| | | |
|---|---|---|
| GB | 2179501 | 3/1987 |
| JP | 8000364 | 1/1996 |

\* cited by examiner

CABLE/WIRE AND ELECTRONIC DEVICE STORAGE CONTAINER

CROSS REFERENCE TO RELATED APPLICATIONS

This application claims priority to U.S. provisional application designated Ser. No. 60/391,540, having a filing date Jun. 25, 2002, and entitled "Cable/wire and modem storage box".

BACKGROUND

Wire management has become quite a problem in the modern age. With the advent and ubiquity of computers and computer peripherals in homes, offices, and dormitories, most technology users have found themselves inundated with messy and disorganized wires leading to and from their electronic equipment. This inundation is caused by the number of wires going to and from computers and the increasing number of peripherals and electronic devices now used with computers. For example, many users have a cable, DSL or telephone modem, a network hub, a router, a zip drive, a personal digital assistant and/or other devices that need to be connected either to electrical outlets or to other devices or computer equipment on a continuing basis.

Thus, not only do these electronic devices and wires result in an unsightly mess in themselves, but they also make it difficult to clean the areas around, behind or beneath the devices. Furthermore, hanging wires and unstable devices pose an entanglement and electrical danger for small children and pets. Even inadvertent tampering or jostling can disconnect or lead to damage of certain electronic peripherals, requiring time-consuming efforts to discern why the system is not working or even expensive repairs or replacements.

Commonly one or more devices or peripherals travel with the user to other settings, particularly laptop computers and personal digital assistants. The storage device described here facilitates easy separation and return connection of these mobile devices and any attached wires or cables out of and back to their dedicated sections.

At times, complete mobility of wires and other devices is required. For example, when moving, renters and dorm dwellers must disconnect their many devices and wires. This disconnection leads to disarray, storage and labeling requirements, and lost time during later efforts at identification and re-assembly. Any organization the user had in place is necessarily lost when each of the wires and devices must be unplugged and moved independently. Thus, there is a need for a storage device that can be used to contain and organize certain electronic devices and wires when they are in use, and also to make it easy to transport these together while maintaining their organization, when moving them to another space.

U.S. Pat. Nos. 2,763,707 and 3,337,682 each disclose a container for storing slack wires. A device for storing wires that can be plugged into a plug strip is disclosed in U.S. Pat. Nos. 4,944,694 and 5,924,892. These containers have pegs around which extra cable can be wound and stored. U.S. Pat. No. 5,231,562 provides an under-desk compartment (that can be reached through top of the desk surface) for storing wires used in desktop applications. U.S. Pat. No. 6,017,228 provides an electrical station in which multiple devices can be plugged into power and communication ports that are transferred to the organizing device.

Thus all of these devices provide a way to partially store excessive wires and cables. Some of these devices also include electrical outlets or a power strip. However, none of these devices provides a device for storing and organizing the actual electronic devices or computer peripherals (and their attendant wires) while they are in use. None provides space or heat disbursing ventilation for electronic devices. Additionally, none of these storage devices allows for the easy simultaneous transport of a number of electronic devices or computer peripherals and wires without losing organization (i.e., the peripherals such as modems would need to be unplugged from power and computer and moved individually).

Adequate wire management remains an unmet need. According to a survey performed by the inventor, 96% of respondents (68 individuals) answered "yes" to the question "Do you have a tangled mess of cables dangling behind your work area or entertainment system?" Ninety-seven percent (69 individuals) reported cleaning problems and fifty-one percent (36 individuals) endorsed safety concerns. Seventy-seven percent of respondents (54 individuals) stated that they would be either very interested or somewhat interested in "a product that would solve the cord mess problem."

Thus, there is a need for a storage solution that can hold slack wires and electronic devices and provide a power supply. There is also a need for a device that would allow for the easy and organized simultaneous transport of multiple computer peripherals, electronic devices, and wires when moving from one living or working space to another. There is an additional need for a storage device that facilitates easy removal and return of mobile devices.

SUMMARY

In one embodiment, the invention comprises a substantially rectangular storage container for organizing electronic equipment and cables. This substantially rectangular storage container comprises a first rigid divider that is attached to said substantially rectangular storage container and is substantially parallel to two sides of said substantially rectangular storage container, a compartment having a plurality of ventilation holes, wherein said first rigid divider forms one side of said compartment, and a plurality of electrical outlets associated with said first rigid divider. The first rigid divider is preferably substantially rectangular. Preferably, the substantially rectangular storage container further comprises an access aperture that is accessible from said compartment. In some embodiments, the substantially rectangular storage container further comprises a second rigid divider attached to said substantially rectangular storage container, and substantially parallel to said first rigid divider. Preferably, the rigid divider is removably attached to said substantially rectangular storage container, wherein the size of said compartment can be adjusted by modifying the position of attachment of said first rigid divider in said substantially rectangular storage container. In some embodiments, the substantially rectangular storage container further comprises a telephone jack assembly on a divider, said telephone jack assembly including a female telephone modular jack electrically connected to a length of telephone station wire, said wire terminated with a male telephone modular plug. In yet another embodiment, at least one spacer is attached to the outside bottom surface of said substantially rectangular storage container. Preferably, the at least one spacer is a plurality of castors.

In another embodiment, the invention comprises a kit for converting a substantially rectangular storage container into a cable and electronics storage device, comprising (a) a first rigid divider that is attachable to said storage container, (b) a plurality of electrical outlets attached or attachable to the top edge of said first rigid divider, and (c) instructions for perforating said storage container with a plurality of holes. The first rigid divider is preferably substantially rectangular. In an even more preferred embodiment, the kit further comprises at least two grooved strips for attachment to the sides of the storage container and said first rigid divider comprises a groove mating surface along at least two substantially parallel edges. Preferably, the kit further comprises an adhesive for attaching said strips. A second rigid divider is preferably attached or attachable to said storage container. In a most preferred embodiment, the second rigid divider is shorter than said first rigid divider when said first and said second rigid dividers are installed in said storage container. The first rigid divider is preferably demountably attachable to said storage container, and the size of the compartment that is formed on one side by the rigid divider can be adjusted by changing the position where said first rigid divider is attached to said storage container.

In another embodiment, the invention comprises a kit for assembling a substantially rectangular storage container for storage of electronic equipment and organizing cables, comprising (a) a substantially rectangular storage container comprising a plurality of ventilation holes, (b) a rigid divider attachable to two sides of said substantially rectangular storage container, and (c) a plurality of electrical outlets mounted or mountable on said rigid divider. The rigid divider preferably has groove mating surfaces, and the kit comprises at least two attachable grooves for attachment to said substantially rectangular storage container, wherein said rigid divider is slidably mated to said grooves by said groove mating surfaces.

In another embodiment, the invention comprises a piece of furniture comprising at least one substantially rectangular storage container, wherein the substantially rectangular storage container comprises (a) a plurality of ventilation holes, (b) a first groove on a first side of the container, and (c) a second groove that is substantially parallel to the first groove and that is on a side that is substantially parallel to the first side. Preferably, the substantially rectangular storage container further comprises a rigid divider slidingly inserted into said grooves, and a plurality of electrical outlets on the rigid divider. In a most preferred embodiment, the substantially rectangular container further comprises at least one access aperture.

BRIEF DESCRIPTION OF THE DRAWINGS

The same numerals are used to refer to the same or similar parts in the following figures, wherein.

PREFERRED EMBODIMENTS OF THE INVENTION

As used herein, the term "rectangular" shall mean rectangular or square.

The term "side", as used herein may refer to a bottom side or any other side of a substantially rectangular storage container or other storage device or container.

Figure 1:
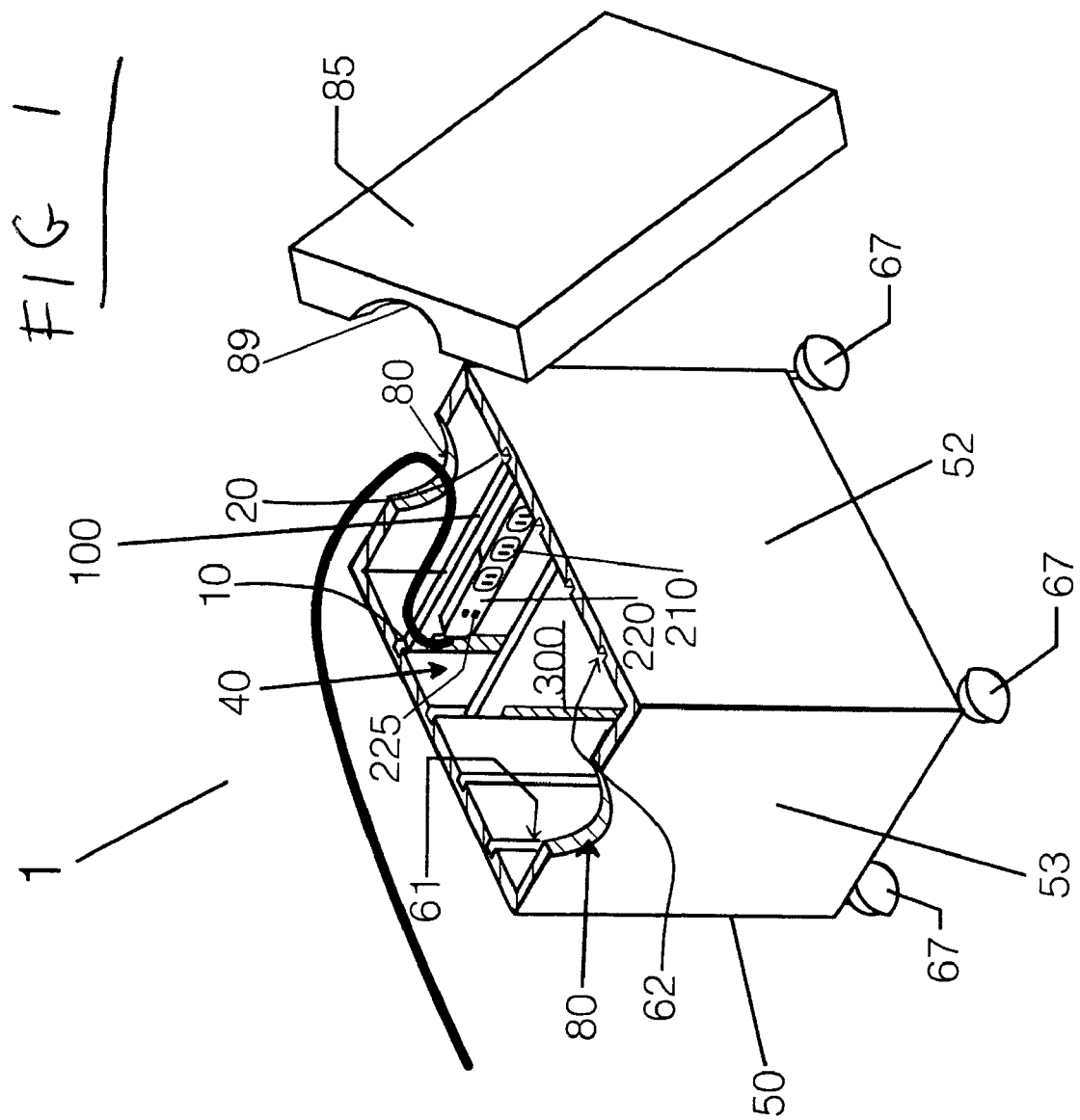
FIG. 1 is an isometric view of a storage device with the lid removed, built according to the invention.
Figure 3:
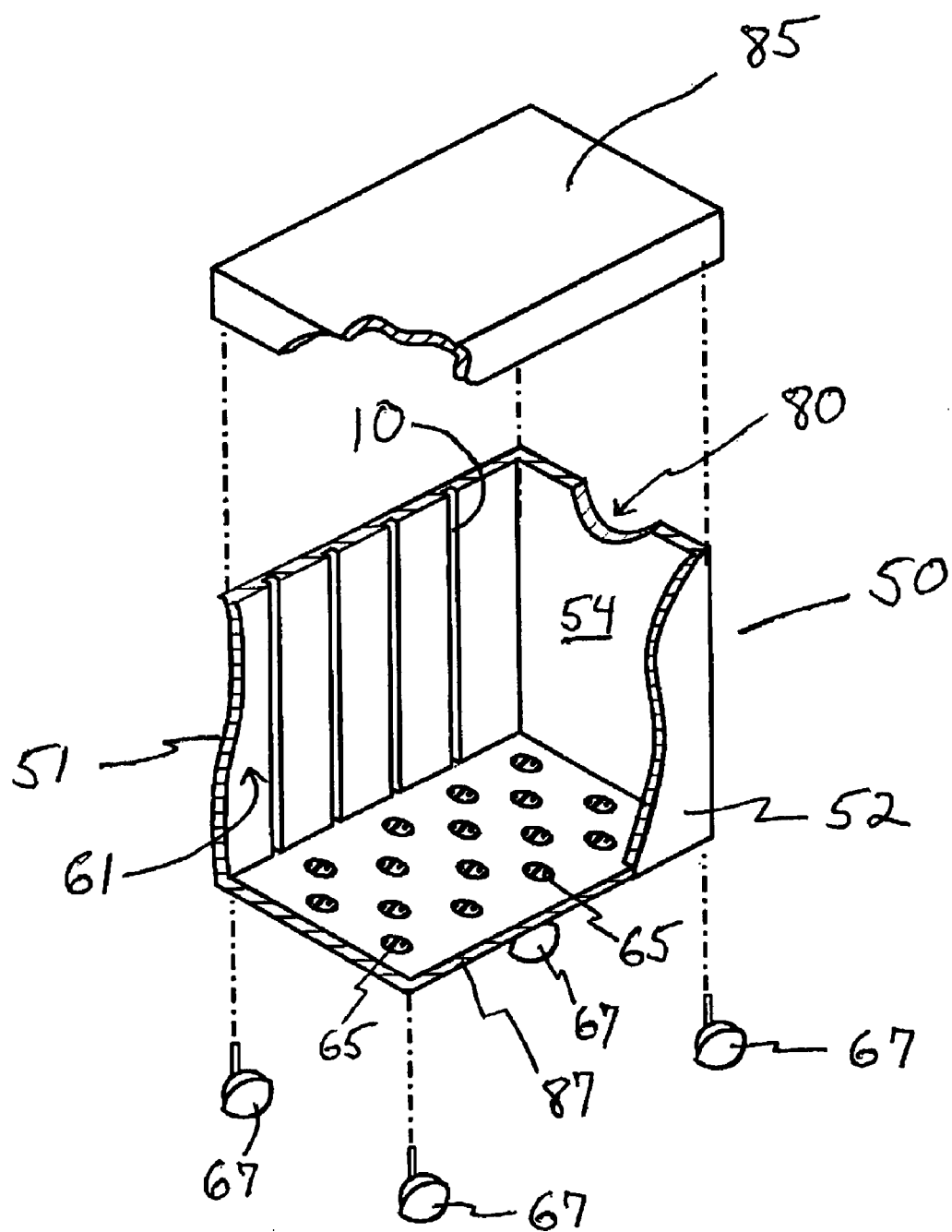
FIG. 3 is a cut-away and exploded view of the substantially rectangular storage container portion of the invention.
Figure 4:
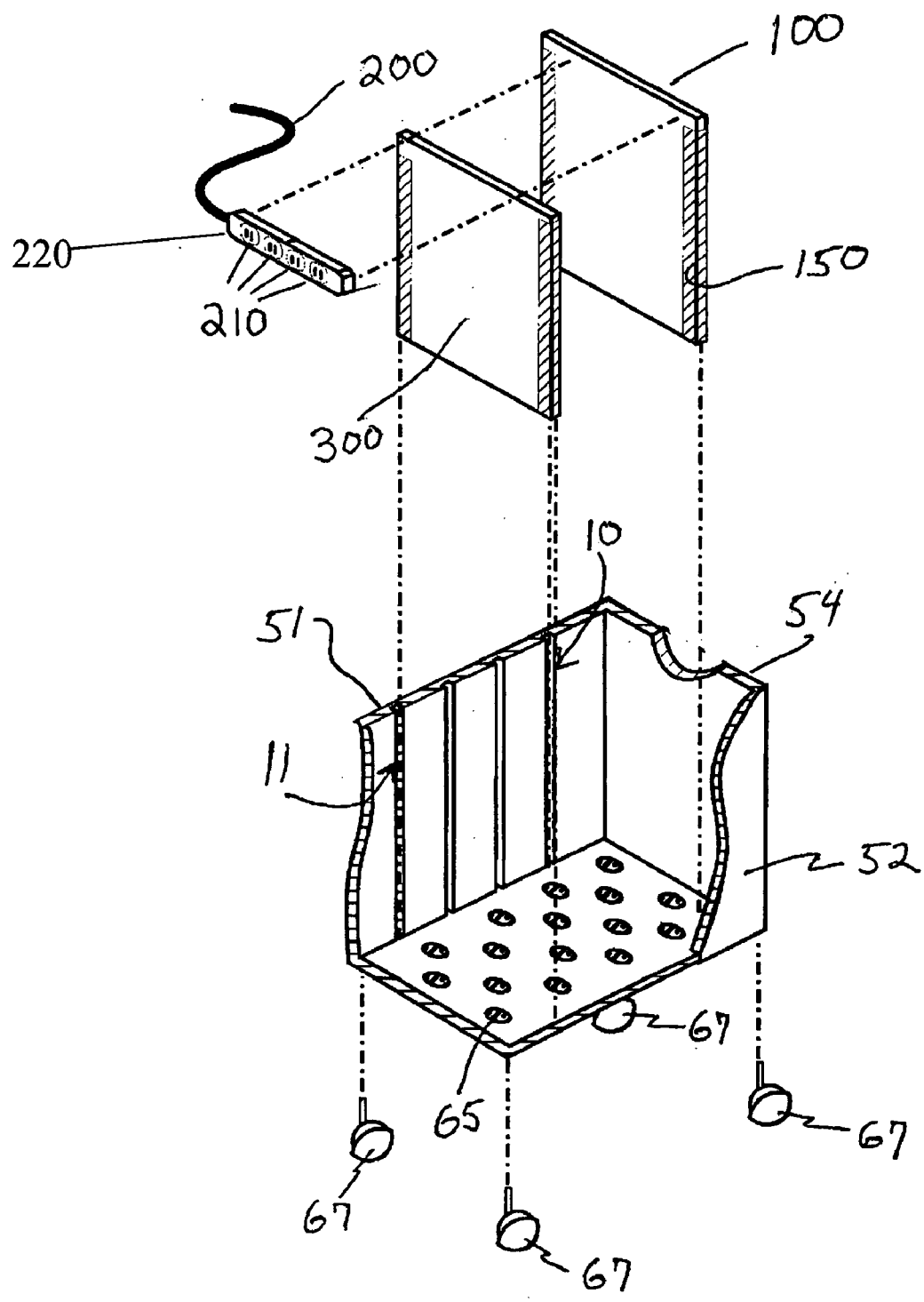
FIG. 4 is a cut-away and exploded view of the invention showing the rigid dividers (lid not shown for clarity)

Thus, in one embodiment, the invention provides a storage device 1 for storing both electronic devices, such as computer peripherals, and excess wires while they are in use. Referring to FIGS. 1, 3, and 4, the storage device 1 comprises a substantially rectangular storage container 50 and a rigid divider 100. Substantially rectangular storage container 50 is box-shaped, and has a lid 85 and a bottom side 87, a left side 51 and a right side 52, and a front side 53 and a back side 54. Side 51 has a groove 10 on a face 61 and side 52 has a groove 20 on a face 62. In one embodiment, groove 10 runs substantially the height of left side 51 and is located a predetermined distance D from front 53. Side 51 and side 52 are generally parallel and are disposed with grooved faces 61, 62 facing each other. Groove 10 and groove 20 are substantially parallel and are located a substantially equal distance from front 53. Preferably the grooves are of equal lengths and depths; preferably said depth is greater than 0.125 inches and less than 50% of the thickness of each side 51 and 52.

Figure 2:
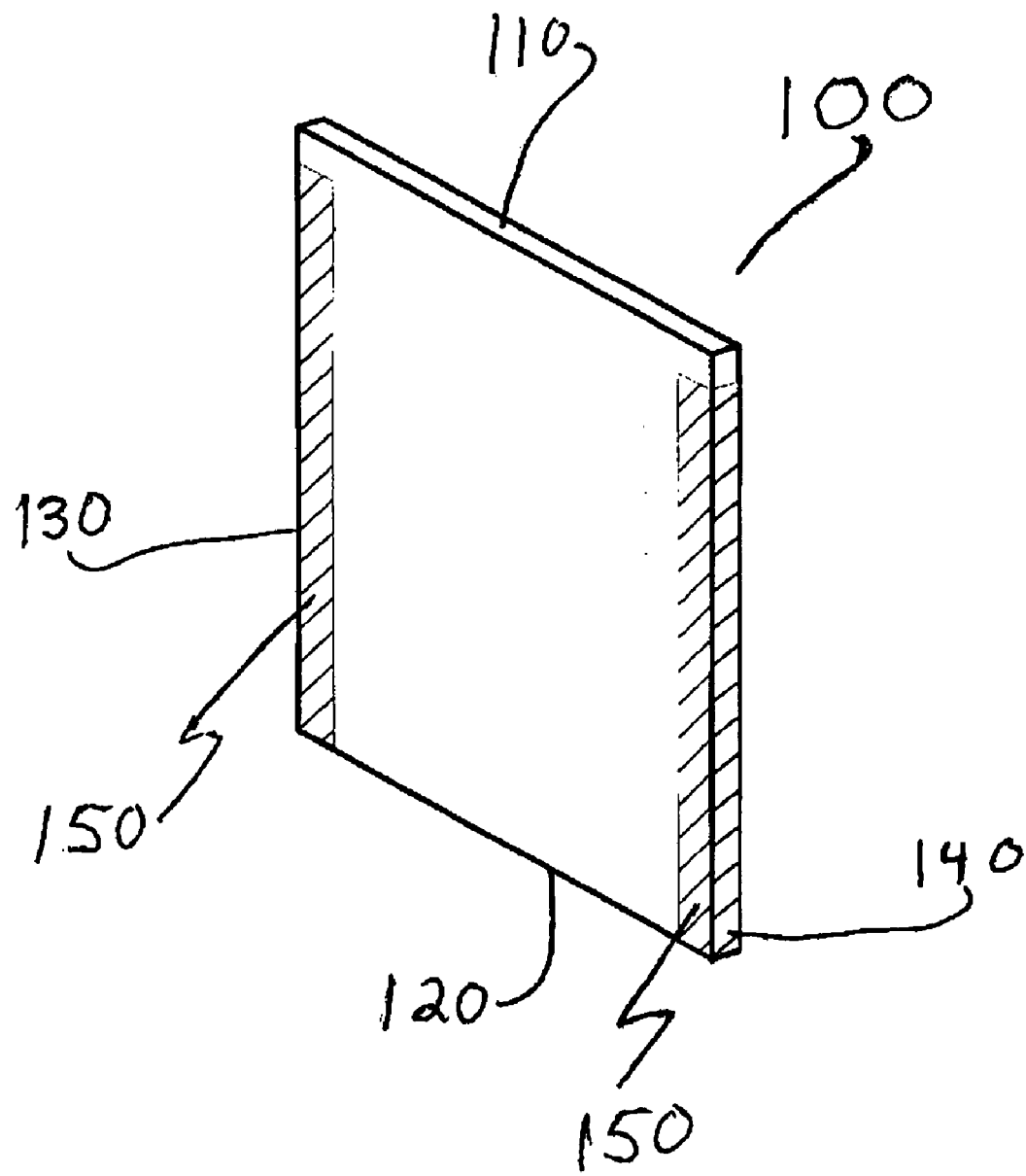
FIG. 2 illustrates a rigid divider 100 built according to the invention.

Referring to FIG. 2, rigid divider 100 is preferably substantially rectangular in shape, said quadrilateral comprising a top edge 110 and a bottom edge 120, and a left edge 130 and a right edge 140. The height and width of divider 100 are determined generally to fit inside substantially rectangular storage container 50. The thickness, generally much less than the height and width, is selected to provide adequate rigidity using the structural properties of the material from which it is fabricated. Preferably, the width of divider 100 is equal to the perpendicular distance between left side 51 and right side 52 plus an additional distance greater than zero and less than the sum of the depths of groove 10 and groove 20. Rigid divider 100 has groove mating surfaces 150 running along the length of left edge 130 and right edge 140. The mating surfaces are disposed on front and back faces of divider 100, extending inward from the edges by a distance generally equal to the depth of the grooves. Additionally, the mating surfaces wrap around the edges from the front face to the back face. Said mating surfaces are smooth and hard to reduce friction and wear, and to facilitate insertion and removal of rigid divider 100 to and from substantially rectangular storage container 50. Mating surfaces 150 are preferably formed inherently during manufacture and by material selection. For example, a hard plastic divider can easily be manufactured with smooth faces and edges. Alternatively, the mating surface for a fiberboard divider may be formed by painting the designated regions or by impregnating said regions with a hard drying glue or epoxy.

Referring back to FIGS. 1, 3, and 4, rigid divider 100 mates with both grooves 10 and 20 to form a dividing side substantially parallel to sides 53 and 54, and perpendicular to sides 51 and 52. Divider 100 can be removed (or installed) by pulling (pushing) it to slide it along grooves 10 and 20. It may alternately be more permanently attached to sides 51 and 52 by a variety of other mechanisms, including a screw (not shown) or nail (not shown) connecting side 51 to the edge of rigid divider 100, and side 52 to the opposing edge of rigid divider 100. In some embodiments, rigid divider 100 additionally has a hole through which a cable 200, which is in electrical connection with electrical outlets 210 and which can be plugged into an electrical outlet outside substantially rectangular storage container 50, can be fed. Cable 200 can be fed through one of the ventilation holes 65 or through access aperture 80 to exit substantially rectangular storage container 50. Electrical outlets 210 are preferably attached or embedded on rigid divider 100. Electrical outlets 210 can be on a power strip, part of a surge protector 220, or otherwise configured.

Substantially rectangular storage container 50 has at least one compartment 40 which can be used to house equipment like a DSL modem, a network router, a wireless network adapter, a network switch box, a cable modem, an alarm clock, or any other such device. Electronic equipment stored in substantially rectangular storage container 50 can be plugged into one or more of electrical outlets 210, and all excess wire stored neatly in compartment 40 or in other compartment(s).

Compartment 40 is thus defined by rigid divider 100 on one side, by side 51 on a second side, by side 52 on a third side, and its fourth side is defined by either a second rigid divider 300 or by one of sides 53 and 54. Compartment 40 is further defined by bottom side 87. Preferably, compartment 40 is substantially square or substantially rectangular in horizontal cross-section. Preferably, multiple pairs of grooves are available on parallel sides 51 and 52 so that the user has the option of changing the size of compartment 40 by deciding in which grooves to place rigid divider 100

Compartment 40 has at least one and preferably a plurality of ventilation holes 65 on at least one of bottom side 87, on one of sides 51, 52, 53, or 54 (which defines compartment 40) or on lid 85. The inventor built a prototype of substantially rectangular storage container 50 with ventilation holes 65 that were ⅝ of an inch in diameter, with six ventilation holes 65 on bottom side 87 under each compartment 40. The skilled artisan will understand that ventilation holes 65 can be any shape, i.e., they do not need to be circular. The open space produced by ventilation holes 65 comprises at least 15% of the area A; of one of the bottom side 87 or other sides that defines compartment 40, said area A being the portion of one of sides, bottom or lid that is directly proximate to compartment 40. Further, the open space produced by ventilation holes 65 comprises preferably 25% of the area, A, more preferably at least 35%, even more preferably at least 45%, and most preferably at least 55% of area A. For example, if 60% of the area of bottom side 87 is under compartment 40, and the remainder of bottom side 87 is under a different compartment, the area, A, refers to the 60% of the bottom area under compartment 40. Of course, multiple compartments and/or sides may have ventilation holes. It will further be apparent to the skilled artisan that ventilation holes 65 need to be on a side that forms either one of the outer sides 51, 52, 53, or 54, bottom side 87 or lid 85 of substantially rectangular storage container 50 so that air can flow from the outside of substantially rectangular storage container 50 into compartment 40. If ventilation holes 65 are on bottom side 87, it is important that bottom side 87 not be flush against the floor, carpeting or other such surface when in use. Thus, in cases where ventilation holes 65 are on the bottom side 87, substantially rectangular storage container 50 may be lifted by attaching castors 67, feet (not pictured), pegs (not pictured) or any other such spacing device in order to allow adequate space for airflow. Even if ventilation holes 65 are not on bottom surface 87, castors 67 may be attached to bottom side 87 for ease in movement of substantially rectangular storage container 50. Such movement may be desirable, for example, when a user needs to reboot a modem inside compartment 40, and thus wishes to bring substantially rectangular storage container 50 closer to the user.

Substantially rectangular storage container 50 may have additional compartments that can be used for storing excess wire and cable going from electrical outlets 210/surge protector 220 to an electronic device in or outside substantially rectangular storage container 50.

In some embodiments, substantially rectangular storage container 50 comprises an access aperture 80, which is an opening through which cables and wires can enter and exit substantially rectangular storage container 50. Access aperture 80 can be on bottom side 87 or on any of side 51, 52, 53, or 54, or on lid 85. Multiple access apertures are alternatively envisioned and ventilation holes 65 may be also utilized for this function.

Lid 85 can close substantially rectangular storage container 50 by any conventional mechanism. As shown in FIG. 1, lid 85 may have cut-outs 89 so lid 85 does not block air flow and/or wires and cables entering or exiting from one or more access aperture(s) 80.

In the case where multiple rigid dividers are available, rigid divider 100 is preferably taller than rigid divider 300, so that when both rigid dividers 100 and 300 are fully seated into their respective grooves in substantially rectangular storage container 50, rigid divider 100 is preferably taller than rigid divider 300 (see FIG. 1). Electrical outlets 210 on a power cord or surge protector 220 are preferably attached or attachable to rigid divider 100 so that at least a portion of one or more electrical outlets 210 is taller than rigid divider 300. This allows for wire and cables stored in compartment 40 and/or other compartments to be plugged into electrical outlet(s) 210 without requiring the user to perform uncomfortable wrist movements and without causing sharp bends (viz., short radius bends) in said wire and cables.

Additionally, a phone jack 225 can be attached or attachable to rigid divider 100 or 300 so that electronics or peripherals in compartment 40 can be plugged into the phone jack 225 in substantially rectangular storage container 50. The phone jack 225 would be attached with standard screws, permanent glue, nails or any other way known to a skilled artisan. In some embodiments the phone jack 225 is incorporated into surge protector 220 on which electrical outlets 210 are housed. In use, the phone jack 225 would be connected to a conventional phone jack through a cable 226 (not pictured) that can be fed through an access aperture 80 or a ventilation hole 65.

In another embodiment, substantially rectangular storage container 50 further provides a flashlight connected to rigid divider 100 by a clip or hook. Preferably, the flashlight is a rechargeable flashlight, said flashlight being recharged from the power strip or surge protector 220.

Substantially rectangular storage container 50 can be made of any stiff material that has sufficient strength to hold multiple computer peripherals or electronic devices. For example, it can be made from wood, particulate board, or plastic, or from a combination of such materials. The rigid dividers can be made from the same or different materials as one or more sides of substantially rectangular storage container 50.

Figure 5:
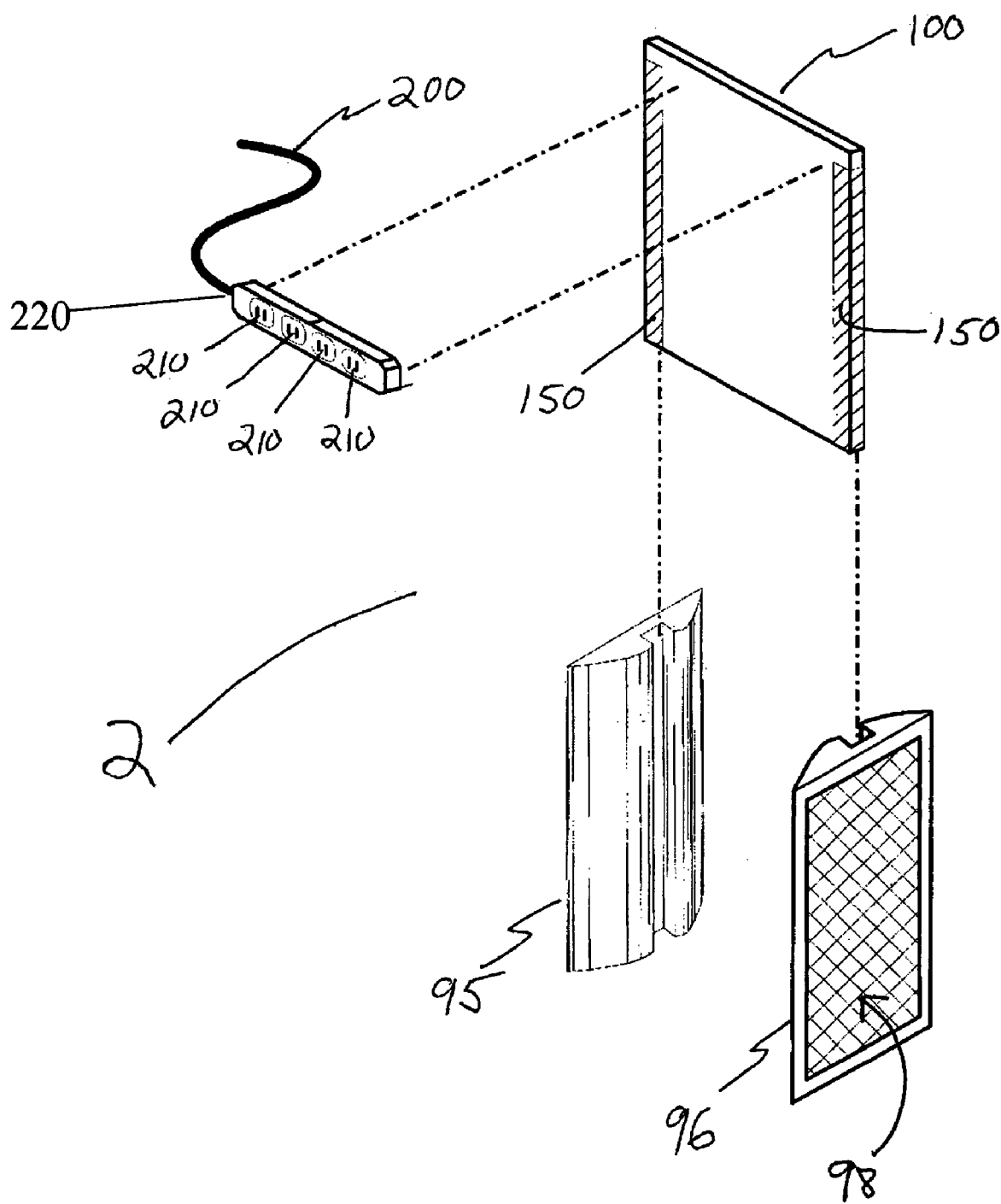
FIG. 5 is an exploded view of a kit embodiment of the invention.
Figure 6:
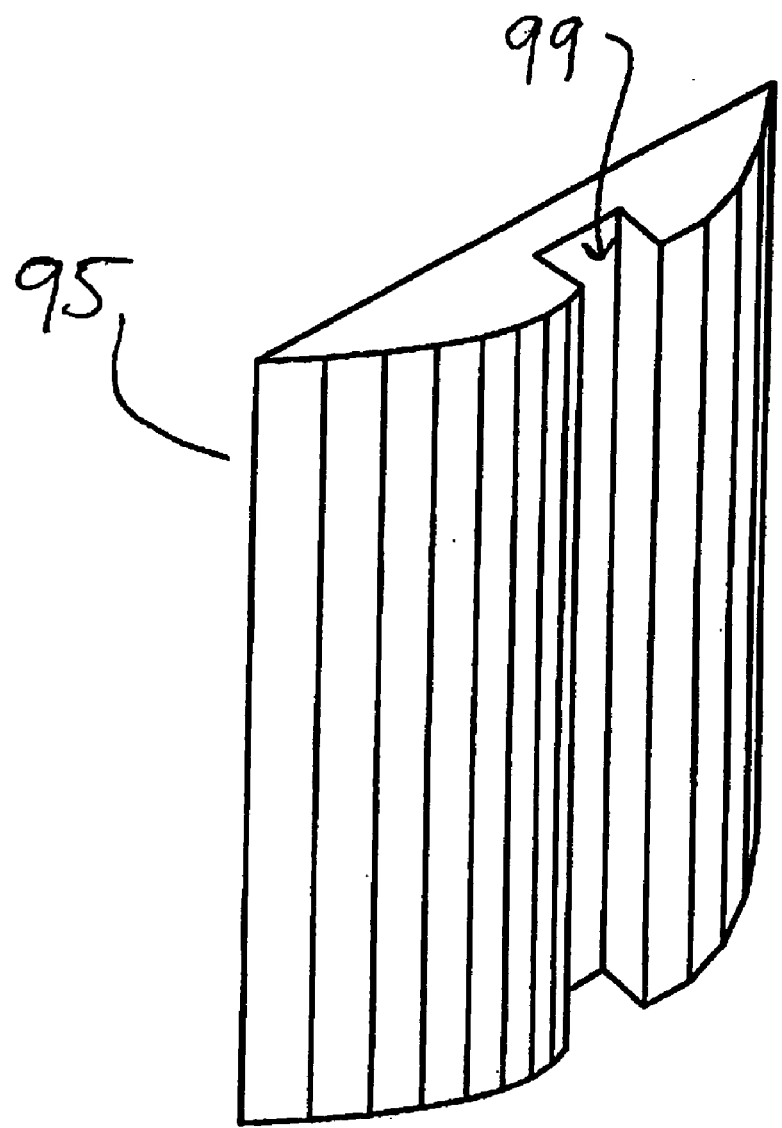
FIG. 6 illustrates a groove strip built according to the invention.

Referring to FIGS. 5 and 6, the invention further provides a kit 2 for converting an existing generally rectangular storage container into a specialized substantially rectangular storage container for storing wires and electronic equipment such as computer peripherals. The storage container might be a drawer in a filing cabinet, entertainment unit or dresser, for example. In one embodiment, the kit comprises at least one of groove strip 95 and groove strip 96, respectively, each of which is attachable to a side of the substantially rectangular storage container. Groove strips 95 and 96 may be sold with glue held by peelable paper on their backside 98, and can thus be attached through glue. Groove strips 95 and 96 can also be attached by screws, nails, or any other conventional ways, and the kit preferably includes screws or nails. Additionally, the kit comprises at least one rigid divider 100 with groove mating surfaces 150 on two parallel edges, so that the rigid divider 100 can fit into groove strips 95 and 96 when groove strips 95 and 96 are attached substantially parallel to each other on two substantially parallel sides of the storage container. In another embodiment, discontinuous grooves are used. For example, instead of having one groove that houses one side of rigid divider 100, two discontinuous grooves (i.e., a top and a bottom groove) are used. In one embodiment, at least four groove strips (i.e., two with bottom grooves and two with top grooves) are included with the kit, and instructions for attaching the groove strips so that a top groove is always above a bottom groove. In another embodiment, each groove strip has multiple grooves. The top grooves may be identical to or different in size and construction than the bottom grooves, and hence the groove strips may be interchangeable. Thus, the kit may comprise four groove strips, each of which has a plurality of top or bottom grooves. By attaching four such groove strips, the user will have the option of inserting the side of rigid divider 100 into one of a multiple set of top and bottom grooves.

Further, the kit includes a plurality of electrical outlets 210 which are on a power cord strip or on surge protector 220. Preferably, the electrical outlets 210 or surge protector 220 may be attached to rigid divider 100 or may be sold with screws, bolts, or nails, brackets for attachment to rigid divider 100 by the user. If it is not attached, instructions are preferably included for installation.

The kit preferably includes instructions for installing the at least two groove strips 95 and 96 and also for installing at least one rigid divider 100 into groove strips 95 and 96. For example, a total of four groove strips may be sold with one rigid divider 100. At least one of the rigid dividers 100 comprises electrical outlets 210 on a power strip or surge protector 220. The skilled artisan will understand that the user will be able to adjust the size of the compartments by inserting less than all the rigid dividers 100 or, if there are more rigid dividers than sets of grooves into which one rigid divider 100 can be inserted, by choosing into which set of grooves to insert the rigid dividers. As used herein, the term "set of grooves" refers to the at least two grooves necessary to attach one divider.

Most preferably, the kit comprises instructions for drilling or otherwise perforating at least one side of the storage container with ventilation holes, and preferably an access aperture. Ventilation holes need to perforate an outer side, bottom, or top of the storage container (i.e., the ventilation holes need to provide air flow from outside the storage container to inside the storage container). In a most preferred embodiment, the instructions provide information about the number and size of ventilation holes that should be created in the storage container, based on the size of the compartment that will be used for storage of wires and electronic devices as well as on the type of electronic devices stored. The skilled artisan will understand that if the kit comprises multiple sets of instructions, they may be printed on the same paper or booklet, or provided through any other well-known way of providing instructions.

Figure 7:
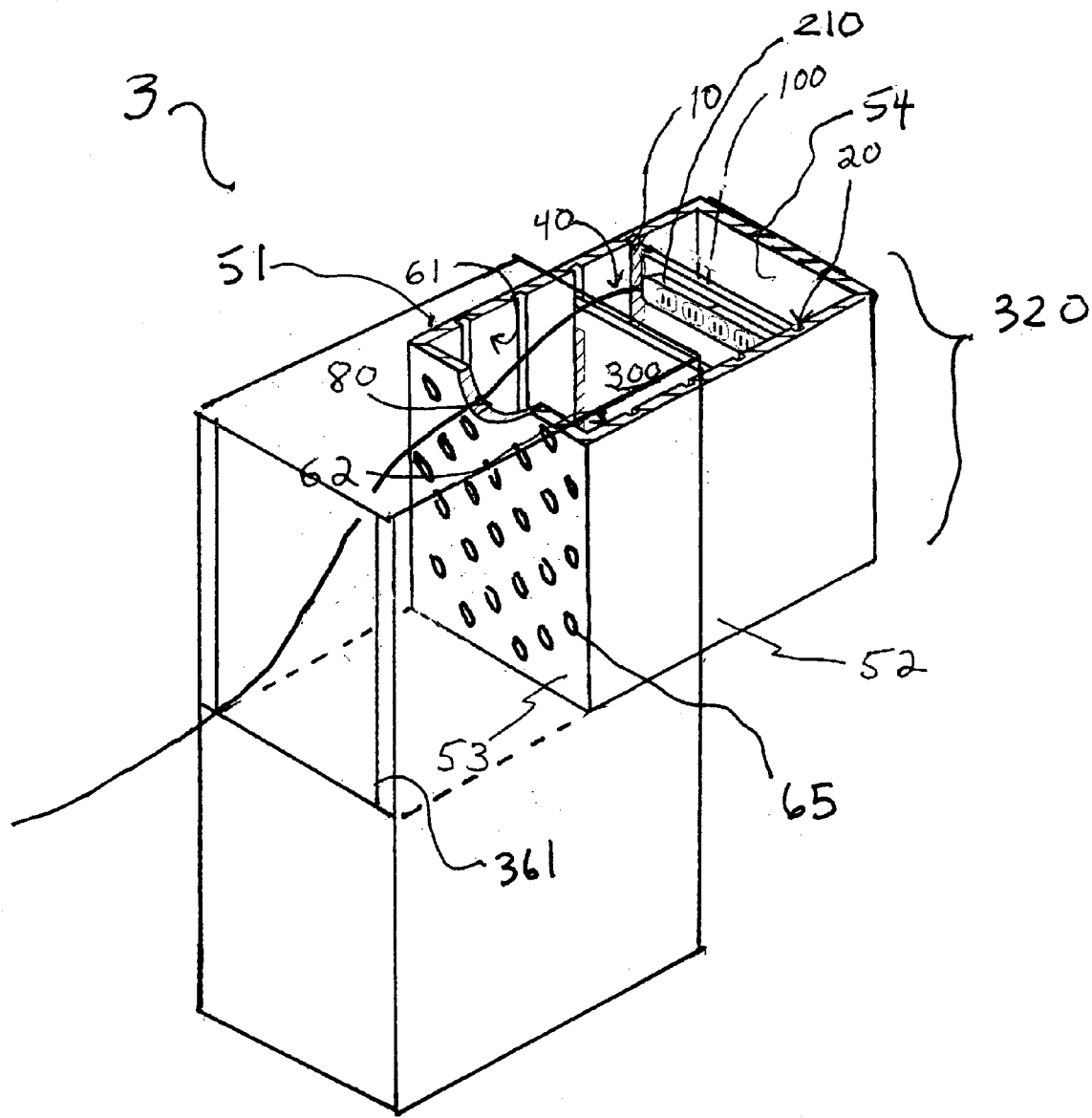
FIG. 7 illustrates a piece of furniture according to the invention.

In another embodiment, the invention comprises a piece of furniture 3 (FIG. 7). The piece of furniture 3 comprises at least one substantially rectangular storage container 320, wherein the substantially rectangular storage container 320 comprises a plurality of ventilation holes 65, a first groove 10 on face 61 of side 51 of said substantially rectangular storage container 320, and a second groove 20 substantially parallel to groove 10 on face 62 of side 52. For example, the piece of furniture 3 might be a filing cabinet or an entertainment center that has a drawer that can be accessed by the user. The storage container 320 is substantially similar to substantially rectangular storage container 5 in FIG. 1, except that it does not necessarily have a lid or castors. Preferably, the storage container 320 slides in and out of furniture 3 when pulled or pushed by the user in much the same way as a conventional drawer in a filing cabinet will slide in or out. If the storage container 320 is situated in a top drawer section, the top surface of furniture 3 could lift up or off like lid 85 in FIG. 1, thus allowing viewing from the top as well as or instead of pulling container 320 out to gain access. Lid 85 can preferably slide in or out as well.

The substantially rectangular storage container 320 is preferably a drawer having sides 51, 52, 53, and 54. Preferably, storage container 320 has at least one access aperture 80 which is near a hole in furniture 3, through which wires and cables can exit furniture 3. The skilled artisan will understand that the first groove 10 is substantially parallel to second groove 20, and that a rigid divider 100 can be inserted into the first and second grooves 10 and 20 to form at least one compartment 40 that has ventilation holes 65 on at least one side of compartment 40. In another embodiment, as described above, multiple rigid dividers (e.g., additional rigid divider 300, etc.) can be attached to the storage compartment by screws, nails, or any other such devices. As described above, rigid divider 100 preferably has a plurality of electrical outlets 210 on a power strip or surge protector 220 attached, and is preferably taller than rigid divider 300 when both are inserted.

The open space produced by ventilation holes 65 comprises at least 15% of the area, of one side of the compartment 40, preferably at least 25%, more preferably at least 35%, even more preferably at least 45%, and most preferably at least 55% of the area of one side of compartment 40. In one embodiment, ventilation holes 65 may be on back side 53 of container 320 and back side 361 of furniture 3 may be removed, partially removed, or perforated with ventilation holes. In this embodiment, the container 320 can be the top or bottom drawer of furniture 3. In another embodiment, if storage container 320 is a bottom drawer of furniture 3, container 320 may have ventilation holes 65 on its bottom and furniture 3 may have no bottom, a partially removed bottom, or a perforated bottom to allow ventilation while providing sufficient support. The skilled artisan will understand that sufficient ventilation is required for use by electronic devices. The skilled artisan will understand that these are just exemplary mechanisms by which ventilation may be achieved in compartment 320.

If the ventilation holes 65 are on the bottom side of furniture 3 or container 320, it is important that the bottom side of furniture 3 not be flush against the floor, carpeting or other such surface when in use. Castors or other spacers can be attached to the bottom side of the furniture 3 (or alternately to other sides of furniture 3 that connect to the bottom side of furniture 3) to provide sufficient air flow.

The skilled artisan will further understand that the contents of the storage container described in the various embodiments of the invention can be organized in any of a number of ways known to the skilled artisan, for example by affixing organizing labels onto rigid divider 100 and any other dividers so that the user can quickly identify where they previously stored a particular cable or piece of electronic equipment.

The skilled artisan will further understand that the substantially rectangular storage containers, furniture, and drawers modified by the invention can be used to store electronic equipment and peripherals other than computer equipment. For example, they can be used in the bedroom, in an entertainment area, or any other place where a plethora of wires running from electronic equipment or devices can cause disorganization and dangerous conditions.

While this invention has been described in conjunction with the specific embodiments outlined above, many alternatives, modifications and variations will be apparent to those skilled in the art. For example, the invention can be used in other orientations, viz, lying on its side with the lid in a vertical plane. Accordingly, the preferred embodiments of the invention as set forth above are intended to be illustrative, and not limiting. Various changes may be made without departing from the spirit and scope of the invention as defined in the following claims.

I claim:

1. A substantially rectangular storage container for organizing electronic equipment and cables, comprising:
   a first rigid divider that is removably attached to said substantially rectangular storage container and is substantially parallel to two sides of said substantially rectangular storage container;
   a compartment having a plurality of ventilation holes, wherein said first rigid divider forms one side of said compartments and wherein the size of said compartment can be adjusted by modifying the position of attachment of said first rigid divider in said substantially rectangular storage container; and
   a plurality of electrical outlets associated with said first rigid divider.

2. The substantially rectangular storage container of claim 1, wherein said first rigid divider is substantially rectangular.

3. The substantially rectangular storage container of claim 1, further comprising an access aperture.

4. The substantially rectangular storage container of claim 1, further comprising a second rigid divider attached to said substantially rectangular storage container, and substantially parallel to said first rigid divider.

5. The substantially rectangular storage container of claim 4, wherein the second rigid divider is shorter than said first rigid divider.

6. The substantially rectangular storage container of claim 2, further comprising a telephone jack attached or attachable to the first rigid divider.

7. The substantially rectangular storage container of claim 1, further comprising at least one spacer that is attached to the outside bottom surface of said substantially rectangular storage container.

8. The substantially rectangular storage container of claim 7, wherein the at least one spacer is castors.

9. A piece of furniture comprising the substantially rectangular storage container of claim 1.

10. The piece of furniture of claim 9, wherein the substantially rectangular storage container further comprises at least one access aperture.

11. The piece of furniture of claim 9, further comprising a telephone jack attached or attachable to the rigid divider.

12. The piece of furniture of claim 9, further comprising a second rigid divider that is shorter than said first rigid divider.

13. The substantially rectangular storage container of claim 1, further comprising a lid.

14. A kit for converting a substantially rectangular storage container into a cable and electronics storage device, comprising: a first rigid divider that is demountably attachable to said substantially rectangular storage container, wherein the size of the compartment that is formed on one side by said first rigid divider can be adjusted by changing the position where said first rigid divider is attached to said substantially rectangular storage container; and
   a plurality of electrical outlets attached or attachable to said first rigid divider.

15. The kit of claim 14, wherein said first rigid divider is substantially rectangular.

16. The kit of claim 15, wherein said kit further comprises at least two grooved strips for attachment to the sides of the substantially rectangular storage container and said first rigid divider comprises at least two substantially parallel edges and a groove mating surface along the at least two substantially parallel edges.

17. The kit of claim 16, further comprising an adhesive for attaching said at least two grooved strips.

18. The kit of claim 16, further comprising a second rigid divider that is attached or attachable to said substantially rectangular storage container.

19. The kit of claim 18, wherein said second rigid divider is shorter than said first rigid divider when said first and said second rigid dividers are installed in said storage container.

20. The kit of claim 14, further comprising a telephone jack attached or attachable to the first rigid divider.

21. A kit for assembling a substantially rectangular storage container for storage of electronic equipment and organizing cables, comprising:
   a substantially rectangular storage container comprising a plurality of ventilation holes;
   a rigid divider slidably attachable to two sides of said substantially rectangular storage container; and
   a plurality of electrical outlets mounted or mountable on said rigid dividers, wherein when the substantially rectangular storage container is assembled, said substantially rectangular storage container comprises a compartment, wherein said rigid divider forms one side of said compartment and wherein the size of said compartment can be adjusted by modifying the position of attachment of said first rigid divider in said substantially rectangular storage container.

22. The kit of claim 21, wherein said rigid divider has groove mating surfaces, and further comprising at least two attachable grooves for attachment to said substantially rectangular storage container, wherein said rigid divider is slidably mated to said grooves by said groove mating surfaces.

23. The kit of claim 21, further comprising a telephone jack attached or attachable to the rigid divider.

* * * * *

UNITED STATES PATENT AND TRADEMARK OFFICE
CERTIFICATE OF CORRECTION

| | | |
|---|---|---|
| PATENT NO. | : 7,038,126 B2 | Page 1 of 1 |
| APPLICATION NO. | : 10/607279 | |
| DATED | : May 2, 2006 | |
| INVENTOR(S) | : Jo Solet | |

It is certified that error appears in the above-identified patent and that said Letters Patent is hereby corrected as shown below:

Column 9, line 33, substitute "compartment" for "compartments".

Column 10, line 46, substitute "dividers" for "divider".

Signed and Sealed this

Fifteenth Day of August, 2006

JON W. DUDAS
*Director of the United States Patent and Trademark Office*